United States Patent
Nooren

(10) Patent No.: US 8,909,266 B2
(45) Date of Patent: Dec. 9, 2014

(54) METHODS, SYSTEMS, AND COMPUTER READABLE MEDIA FOR SHORT MESSAGE SERVICE (SMS) FORWARDING

(71) Applicant: Tekelec Netherlands Group, B.V., Amsterdam (NL)

(72) Inventor: Eloy Johan Lambertus Nooren, Breda (NL)

(73) Assignee: Tekelec Netherlands Group, B.V., Amsterdam (NL)

( * ) Notice: Subject to any disclaimer, the term of this patent is extended or adjusted under 35 U.S.C. 154(b) by 0 days.

(21) Appl. No.: 13/658,128

(22) Filed: Oct. 23, 2012

(65) Prior Publication Data

US 2013/0137471 A1    May 30, 2013

Related U.S. Application Data

(63) Continuation of application No. 12/722,141, filed on Mar. 11, 2010, now abandoned.

(60) Provisional application No. 61/159,337, filed on Mar. 11, 2009.

(51) Int. Cl.
*H04W 4/00* (2009.01)
*H04M 3/42* (2006.01)
*H04W 40/00* (2009.01)
*H04W 4/14* (2009.01)
*H04L 12/58* (2006.01)

(52) U.S. Cl.
CPC ............. *H04W 4/14* (2013.01); *H04L 12/5855* (2013.01); *H04L 12/5895* (2013.01); *H04L 51/14* (2013.01); *H04L 51/38* (2013.01)
USPC ............................ 455/466; 455/417; 455/445

(58) Field of Classification Search
CPC ....... H04W 4/14; H04W 4/12; H04W 88/184; H04W 40/00; H04W 4/20; H04L 12/5855; H04L 12/5895; H04L 51/38; H04L 51/14
USPC .................................. 455/466, 445, 417–418; 379/211.01–212.01; 370/351, 428
See application file for complete search history.

(56) References Cited

U.S. PATENT DOCUMENTS 5,684,951 A    11/1997 Goldman et al.
5,768,509 A     6/1998 Gunluk
(Continued)

FOREIGN PATENT DOCUMENTS

CN    1625146 A    6/2005
EP    1380183 B1   9/2004
(Continued)

OTHER PUBLICATIONS

"3rd Generation Partnership Project; Technical Specification Group Core Network; Unstructured Supplementary Service Data (USSD); Stage 2 (Release 8)" 3GPP TS 23.090, V8.0.0, pp. 1-32, Dec. 2008.

(Continued)

*Primary Examiner* — Michael Mapa
(74) *Attorney, Agent, or Firm* — Pepper Hamilton LLP

(57) ABSTRACT

Methods, systems, and computer readable media for SMS forwarding are disclosed. A message service message routing information response message containing message service message routing information for a first destination may be received. The response message is modified to direct a mobile terminated message service message intended for the first destination to the message service message proxy. The mobile terminated message service message is received at the message service message proxy, which determines whether a message service message forwarding feature is enabled for the first destination. If a message service message forwarding feature is enabled for the first destination, it is determined whether the mobile terminated message service message is eligible for forwarding to a second destination. If the mobile terminated message service message is eligible for forwarding, signaling is initiated to forward the mobile terminated message service message to the second destination.

13 Claims, 8 Drawing Sheets

(56) References Cited

U.S. PATENT DOCUMENTS

| | | | |
|---|---|---|---|
| 6,047,327 A | 4/2000 | Tso et al. |
| 6,091,958 A | 7/2000 | Bergkvist et al. |
| 6,308,075 B1 | 10/2001 | Irten et al. |
| 6,564,055 B1 | 5/2003 | Hronek |
| 6,577,723 B1 | 6/2003 | Mooney |
| 7,072,667 B2 | 7/2006 | Olrik et al. |
| 7,072,976 B2 | 7/2006 | Lee |
| 7,095,829 B2 | 8/2006 | Claudatos et al. |
| 7,116,972 B1 | 10/2006 | Zhang et al. |
| 7,120,455 B1 | 10/2006 | Chen et al. |
| 7,136,634 B1 | 11/2006 | Rissanen et al. |
| 7,155,243 B2 | 12/2006 | Baldwin et al. |
| 7,248,857 B1 | 7/2007 | Richardson et al. |
| 7,269,431 B1 | 9/2007 | Gilbert |
| 7,299,050 B2 | 11/2007 | Delaney et al. |
| 7,319,880 B2 | 1/2008 | Sin |
| 7,321,779 B2 | 1/2008 | Kang |
| 7,394,818 B1 | 7/2008 | Johnson et al. |
| 7,403,788 B2 | 7/2008 | Trioano et al. |
| 7,454,164 B2 | 11/2008 | Goss |
| 7,463,898 B2 | 12/2008 | Bayne |
| 7,502,335 B2 | 3/2009 | Lin |
| 7,548,756 B2 | 6/2009 | Velthuis et al. |
| 7,761,105 B2 | 7/2010 | Harding |
| 7,817,987 B2 | 10/2010 | Mian et al. |
| 7,912,908 B2 | 3/2011 | Cai et al. |
| 7,917,128 B2 | 3/2011 | Niekerk et al. |
| 8,326,265 B2 | 12/2012 | Nooren |
| 2001/0046856 A1 | 11/2001 | McCann |
| 2002/0010745 A1 | 1/2002 | Schneider |
| 2002/0013711 A1 | 1/2002 | Ahuja et al. |
| 2002/0023164 A1 | 2/2002 | Lahr |
| 2002/0095333 A1 | 7/2002 | Jokinen et al. |
| 2002/0098856 A1 | 7/2002 | Berg et al. |
| 2002/0120717 A1 | 8/2002 | Giotta |
| 2002/0126708 A1 | 9/2002 | Skog et al. |
| 2002/0147928 A1 | 10/2002 | Mahajan et al. |
| 2002/0181448 A1 | 12/2002 | Uskela et al. |
| 2002/0187794 A1 | 12/2002 | Fostick et al. |
| 2002/0193127 A1 | 12/2002 | Martschitsch |
| 2003/0003935 A1 | 1/2003 | Vesikivi et al. |
| 2003/0027591 A1 | 2/2003 | Wall |
| 2003/0032409 A1 | 2/2003 | Hutcheson et al. |
| 2003/0069991 A1 | 4/2003 | Brescia |
| 2003/0076941 A1 | 4/2003 | Tiliks et al. |
| 2003/0093314 A1 | 5/2003 | Leung et al. |
| 2003/0096625 A1 | 5/2003 | Lee et al. |
| 2003/0131263 A1 | 7/2003 | Keane et al. |
| 2004/0019695 A1* | 1/2004 | Fellenstein et al. ........... 709/239 |
| 2004/0054576 A1 | 3/2004 | Kanerva et al. |
| 2004/0137922 A1 | 7/2004 | Kang |
| 2004/0171393 A1 | 9/2004 | Harding |
| 2004/0203581 A1 | 10/2004 | Sharon et al. |
| 2004/0221011 A1 | 11/2004 | Smith et al. |
| 2004/0243719 A1 | 12/2004 | Roselinsky |
| 2005/0003838 A1 | 1/2005 | McCann et al. |
| 2005/0021666 A1 | 1/2005 | Dinnage et al. |
| 2005/0027867 A1 | 2/2005 | Mueller et al. |
| 2005/0068971 A1 | 3/2005 | Meisl et al. |
| 2005/0130685 A1 | 6/2005 | Jenkin |
| 2005/0164721 A1 | 7/2005 | Yeh et al. |
| 2005/0182968 A1 | 8/2005 | Izatt et al. |
| 2005/0232236 A1 | 10/2005 | Allison et al. |
| 2006/0047572 A1 | 3/2006 | Moore et al. |
| 2006/0120358 A1 | 6/2006 | Narasimhan et al. |
| 2006/0136560 A1* | 6/2006 | Jiang ........................ 709/206 |
| 2006/0168003 A1 | 7/2006 | Vau et al. |
| 2006/0199597 A1 | 9/2006 | Wright |
| 2006/0211406 A1 | 9/2006 | Szucs et al. |
| 2006/0218613 A1 | 9/2006 | Bushnell |
| 2006/0253453 A1 | 11/2006 | Chmaytelli et al. |
| 2007/0011261 A1 | 1/2007 | Madams et al. |
| 2007/0026878 A1 | 2/2007 | Midkiff et al. |
| 2007/0072591 A1 | 3/2007 | McGary et al. |
| 2007/0088851 A1 | 4/2007 | Levkovitz et al. |
| 2007/0093260 A1* | 4/2007 | Billing et al. ................. 455/466 |
| 2007/0206747 A1 | 9/2007 | Gruchala et al. |
| 2007/0271139 A1 | 11/2007 | Fiorini |
| 2007/0275738 A1 | 11/2007 | Hewes et al. |
| 2007/0281718 A1 | 12/2007 | Nooren |
| 2007/0282954 A1 | 12/2007 | Kim et al. |
| 2007/0287463 A1 | 12/2007 | Wilson |
| 2008/0004046 A1 | 1/2008 | Mumick et al. |
| 2008/0004047 A1 | 1/2008 | Hill et al. |
| 2008/0026778 A1 | 1/2008 | Cai et al. |
| 2008/0031196 A1 | 2/2008 | Marathe et al. |
| 2008/0045246 A1 | 2/2008 | Murtagh et al. |
| 2008/0051066 A1 | 2/2008 | Bandhole et al. |
| 2008/0101370 A1 | 5/2008 | Marsico et al. |
| 2008/0113677 A1 | 5/2008 | Madnawat |
| 2008/0125117 A1 | 5/2008 | Jiang |
| 2008/0139170 A1 | 6/2008 | Kahn |
| 2008/0161028 A1 | 7/2008 | Fondeé et al. |
| 2008/0171549 A1* | 7/2008 | Hursey et al. ................. 455/445 |
| 2008/0207181 A1 | 8/2008 | Jiang |
| 2008/0243619 A1 | 10/2008 | Sharman et al. |
| 2008/0285735 A1 | 11/2008 | Ravishankar et al. |
| 2008/0287150 A1 | 11/2008 | Jiang et al. |
| 2009/0017794 A1 | 1/2009 | Wilson |
| 2009/0047980 A1 | 2/2009 | Wilson |
| 2009/0111489 A1 | 4/2009 | Wilson |
| 2010/0105355 A1 | 4/2010 | Nooren |
| 2010/0210292 A1 | 8/2010 | Nooren |
| 2010/0233992 A1 | 9/2010 | Nooren |
| 2010/0235911 A1 | 9/2010 | Nooren |
| 2013/0095793 A1 | 4/2013 | Nooren |
| 2013/0178238 A1 | 7/2013 | Nooren |

FOREIGN PATENT DOCUMENTS

| | | |
|---|---|---|
| EP | 1705885 A1 | 9/2006 |
| EP | 1906682 A1 | 4/2008 |
| KR | 10-2003-0000491 A | 1/2003 |
| KR | 10-2008-0006225 A | 1/2008 |
| KR | 10-2008-0054737 A | 6/2008 |
| KR | 10-2008-0111175 A | 12/2008 |
| WO | WO 99/49686 A2 | 9/1999 |
| WO | WO 01/06679 A1 | 1/2001 |
| WO | WO 02/39765 A1 | 5/2002 |
| WO | WO 02/063849 A1 | 8/2002 |
| WO | WO 02/078381 A1 | 10/2002 |
| WO | WO 03/001770 A2 | 1/2003 |
| WO | WO 2003/088690 A1 | 10/2003 |
| WO | WO 2004/100470 A1 | 11/2004 |
| WO | WO 2004/104735 A2 | 12/2004 |
| WO | WO 2004/105405 A2 | 12/2004 |
| WO | WO 2005/091656 A1 | 9/2005 |
| WO | WO 2005091656 A1 * | 9/2005 ............... H04Q 7/22 |
| WO | WO 2005/101872 A1 | 10/2005 |
| WO | WO 2007/080570 A1 | 7/2007 |
| WO | WO 2007/084503 A2 | 7/2007 |
| WO | WO 2007/141762 A1 | 12/2007 |
| WO | WO 2008/057206 A2 | 5/2008 |
| WO | WO 2008/057259 A2 | 5/2008 |
| WO | WO 2008/085830 A1 | 7/2008 |
| WO | WO 2008/130565 A1 | 10/2008 |
| WO | WO 2010/045646 A2 | 4/2010 |
| WO | WO 2010/094038 A2 | 8/2010 |
| WO | WO 2010/105043 A2 | 9/2010 |
| WO | WO 2010/105099 A2 | 9/2010 |

OTHER PUBLICATIONS

"3rd Generation Partnership Project; Technical Specification Group Services and System Aspects; Unstructured Supplementary Service Data (USSD); Stage 1 (Release 8)" 3GPP TS 22.090, V8.0.0, pp. 1-10, Dec. 2008.

"3rd Generation Partnership Project; Technical Specification Group Core Network and Terminals; Study into routeing of MT-SMs via the HPLMN (Release 7)" 3GPP TR 23.840 V7.1.0, Mar. 2007.

"3rd Generation Partnership Project; Technical Specification Group Terminals; Technical Realization of the Short Message Service (SMS) (Release 1998)" 3GPP TX 03.40 V7.5.0, pp. 1-118, Dec. 2001.

(56) References Cited

OTHER PUBLICATIONS

"3rd Generation Partnership Project; Technical Specification Group Terminals; Technical Realization of Cell Broadcast Service (CBS) (Release 1998)" 3GPP TS 03.41 V7.4.0, pp. 1-31, Sep. 2000.
"Digital Cellular Telecommunications System (Phase 2+); Mobil Application Part (MAP) Specification (3GPP TS 09.02 Version 7.15.0 Release 1998)" GSM (Global System for Mobile Communications), ETSI TS 100 974, V7.15.0 pp. 1-118, Mar. 2004.
"Digital Cellular Telecommunications System (Phase 2+); Universal Mobile Telecommunications System (UMTS); Technical Realization of Short Message Service (SMS)" 3GPP TS 23.040, Version 9.1.0, Release 9, Jan. 2010.
"Messaging Service Suite" http://www.telogic.com.sg/Telecom_Sol_MessagingService.html, Telogic Co. (Copyright 2006).
"Push Access Protocol" Apr. 29, 2001, Wireless Application Protocol, WAP-247-PAP-20010429.a, Version Apr. 29, 2001, pp. 1-49.
International Search Report and Written Opinion for PCT/US 2004/014734 dated Feb. 10, 2006.
International Search Report and Written Opinion for PCT/US 2007/22664 dated Mar. 14, 2008.
International Search Report and Written Opinion for PCT/US 2007/22440 dated Mar. 14, 2008.
International Search Report and Written Opinion for PCT/US 2008/000038 dated May 21, 2008.
International Search Report and Written Opinion for PCT/US 2009/061187 dated May 17, 2010.
International Search Report and Written Opinion for PCT/US 2010/027043 dated Oct. 19, 2010.
International Search Report and Written Opinion for PCT/US 2010/024317 dated Oct. 4, 2010.
International Search Report and Written Opinion for PCT/US 2010/026964 dated Sep. 27, 2010.
ROACH "Session Initiation Protocol (SIP)—Specific Event Notification" Jun. 2002, Network Working Group RFC 3265.

* cited by examiner

METHODS, SYSTEMS, AND COMPUTER READABLE MEDIA FOR SHORT MESSAGE SERVICE (SMS) FORWARDING

PRIORITY CLAIM

This application claims the benefit of U.S. Provisional Patent Application Ser. No. 61/159,337 filed on Mar. 11, 2009; the disclosure of which is incorporated herein by reference in its entirety.

TECHNICAL FIELD

The subject matter described herein relates to delivering SMS messages. More specifically, the subject matter relates to methods, systems, and computer readable media for providing SMS message forwarding.

BACKGROUND

Today, it is possible to setup forwarding for calls (hereinafter, "call forwarding"). Call forwarding is a feature that allows an incoming call to a called party to be redirected to another telephone number of the called party's choosing. Two different types of call forwarding may exist. The first type of call forwarding is called unconditional forwarding and may include automatically forwarding all calls from a first telephone number to a second telephone number, regardless of any conditions. For example, if subscriber B has setup unconditional forwarding to C, all calls to B will be redirected to C. The second type of call forwarding is called conditional forwarding and may include initially trying to reach the called party at a first number, and if the called party is unavailable (i.e., the condition), forwarding the call to a second number. For example, if subscriber B has setup conditional forwarding to C, all calls to B will first be tried on B and when B is not available, the call will be redirected to C.

In contrast to forwarding services provided for calls, no such service is available for forwarding SMS messages. In other words, present SMS message delivery systems do not provide for forwarding SMS messages, either conditionally or unconditionally, as is provided for calls.

Accordingly, in light of these difficulties, a need exists for improved methods, systems, and computer readable media for SMS message delivery.

SUMMARY

Methods, systems, and computer readable media for SMS forwarding are disclosed. One method includes performing steps by a message service message proxy separate from a short message service center and implemented on a computing platform including at least one processor. The steps include receiving a message service message routing information response message containing message service message routing information for a first destination. The response message is modified to direct a mobile terminated message service message intended for the first destination to the message service message proxy. The mobile terminated message service message is then received at the message service message proxy and the message service message proxy determines whether a message service message forwarding feature is enabled for the first destination. In response to determining that a message service message forwarding feature is enabled for the first destination, it is determined whether the mobile terminated message service message is eligible for forwarding to a second destination. In response to determining the mobile terminated message service message is eligible for forwarding, signaling is initiated to forward the mobile terminated message service message to the second destination.

A system for providing SMS forwarding is also disclosed. The system includes a message service message proxy for receiving a message service message routing information response message containing message service message routing information for a first destination. The response message is modified by the message service message proxy to direct a mobile terminated message service message intended for the first destination to the message service message proxy. The mobile terminated message service message is then received at the message service message proxy and the message service message proxy determines whether a message service message forwarding feature is enabled for the first destination. In response to determining that a message service message forwarding feature is enabled for the first destination, the message service message proxy determines whether the mobile terminated message service message is eligible for forwarding to a second destination. In response to determining the mobile terminated message service message is eligible for forwarding, the message service message proxy initiates signaling to forward the mobile terminated message service message to the second destination.

The subject matter described herein for providing SMS forwarding may be implemented using a non-transitory computer readable medium to having stored thereon executable instructions that when executed by the processor of a computer control the processor to perform steps. Exemplary non-transitory computer readable media suitable for implementing the subject matter described herein include chip memory devices or disk memory devices accessible by a processor, programmable logic devices, and application specific integrated circuits. In addition, a computer readable medium that implements the subject matter described herein may be located on a single computing platform or may be distributed across plural computing platforms.

BRIEF DESCRIPTION OF THE DRAWINGS

The subject matter described herein will now be explained with reference to the accompanying drawings of which.

DETAILED DESCRIPTION

The subject matter described herein includes methods and systems for providing SMS forwarding. Specifically, a new network element for providing conditional and/or unconditional SMS Forwarding service is disclosed. When a global system for mobile communications (GSM) subscriber registers with the SMS Forwarding service described herein, it may be desirable for all of its mobile terminated short messages (MT/SMs) to be subject to the SMS forwarding service. However, a conventional short message service centre (SMSC) may not be the best network element to perform SMS forwarding because not all MT/SMs for a given GSM subscriber flow through its own SMSC. For example, in conventional SMS messaging, a GSM subscriber always submits a mobile originated short message (MO/SM) to its home SMSC and a GSM SMSC always delivers the MT/SM directly. SMS messages do not flow between SMSCs. Therefore, if a mobile operator implements SMS forwarding service in its SMSC, the service would only affect the SMS messages submitted by its own subscribers, which may be undesirable. Instead, it may be more desirable for any SMS forwarding service to affect the short messages delivered to its subscribers. Due to the limitations of conventional SMSCs and their operations, the SMS forwarding service described herein may be implemented by a new network element. This network element, which may hereinafter be referred to as a "message service message proxy server" or "MT/SM proxy", should receive all MT/SMs of any subscriber that registers with the SMS forwarding service. The message service message proxy may be separate from the SMSC and may be implemented on a computing platform having one or more processors.

Figure 1:
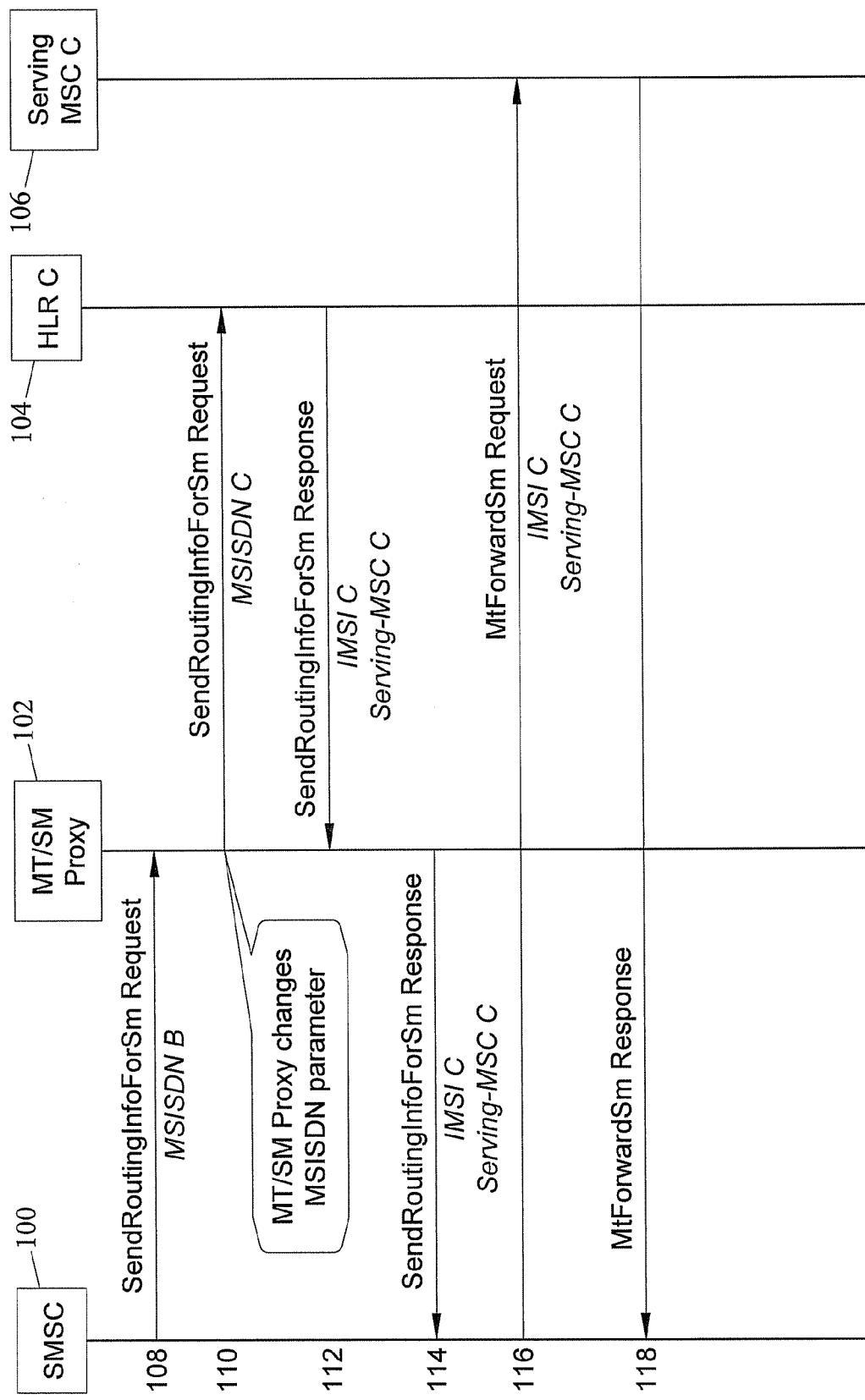
FIG. 1 is a message flow diagram illustrating an exemplary basic unconditional SMS forwarding scenario according to an embodiment of the subject matter described herein.

FIG. 1 is a message flow diagram illustrating an exemplary basic unconditional SMS forwarding scenario according to an embodiment of the subject matter described herein. It may be appreciated that basic unconditional SMS forwarding may be the simplest method to implement unconditional forwarding by intercepting the SendRoutingInfoForSm request from the SMSC, changing the mobile station international subscriber directory number (MSISDN) parameter, and relaying the request to the home location register (HLR).

Referring to FIG. 1, network components may include SMSC 100, MT/SM proxy 102, HLR C 104, and serving mobile switching center (MSC) C 106. SMSC 100 may be responsible for relaying and store-and-forwarding of short messages between a short messaging entity (SME) and mobile station. An SME is an entity that may receive or send short messages. The SME may be located in the fixed network, a mobile station, or another service center. MT/SM proxy 102 may be responsible for providing SMS forwarding service to subscribers. HLR C 104 is a database that contains details of each mobile phone subscriber that is authorized to use the GSM core network. It is appreciated that there can be several logical and/or physical HLRs per public land mobile network (PLMN). MSC C 106 may process requests for service connections from mobile devices and land line callers and route calls between base stations and the public switched telephone network (PSTN). MSC C 106 may also receive dialed digits, create and interpret call processing tones, and route call paths.

In FIG. 1, subscriber B is the intended recipient of the MT/SM and has set up unconditional forwarding to C. For example, in step 108, SMSC 100 may begin by sending a SendRoutingInfoForSm Request message for MSISDN B to MT/SM proxy 102. In step 110, MT/SM proxy 102 may modify the MSISDN parameter from B to C, and forward a SendRoutingInfoForSm Request message including MSISDN C to HLR C 104. In response, HLR C 104 may return a SendRoutingInforForSm Response message including message parameters for international mobile subscriber identity (IMSI) C and serving MSC C 106 in step 112. MT/SM proxy 102 may then receive and forward the SendRoutingInfoForSm Response message, unmodified, to SMSC 100 in step 114. In step 116, SMSC 100 may send an MtForwardSm Request message including IMSI C and an identifier for serving MSC C to serving MSC C 106. Serving MSC C 106 may then return MtForwardSm Response message in step 118.

The basic unconditional forwarding described above may have some drawbacks. For example, it may be difficult to detect (and break) forwarding loops. A simple forwarding loop is a case where B has setup forwarding to C and C to B. Using basic unconditional forwarding, however, if B and C are subscribers of different mobile networks, a loop might result in SendRoutingInfoForSm requests bouncing between B's network and C's network. Another drawback to basic unconditional SMS forwarding is that while some MT/SM types may be eligible for forwarding, others may not. Exemplary MT/SM types that should not be forwarded may include a subscriber identify module (SIM) data download message and a GSM status report message. With a SIM data download message, a mobile operator provisions settings on a mobile. With a GSM status report message, an SMSC informs the sender of an SMS about the delivery result of the SMS (e.g. successful, failed, expired). In order to overcome the drawbacks of basic unconditional SMS forwarding, a method for enhanced unconditional forwarding will now be described below with respect to FIG. 2.

Figure 2:
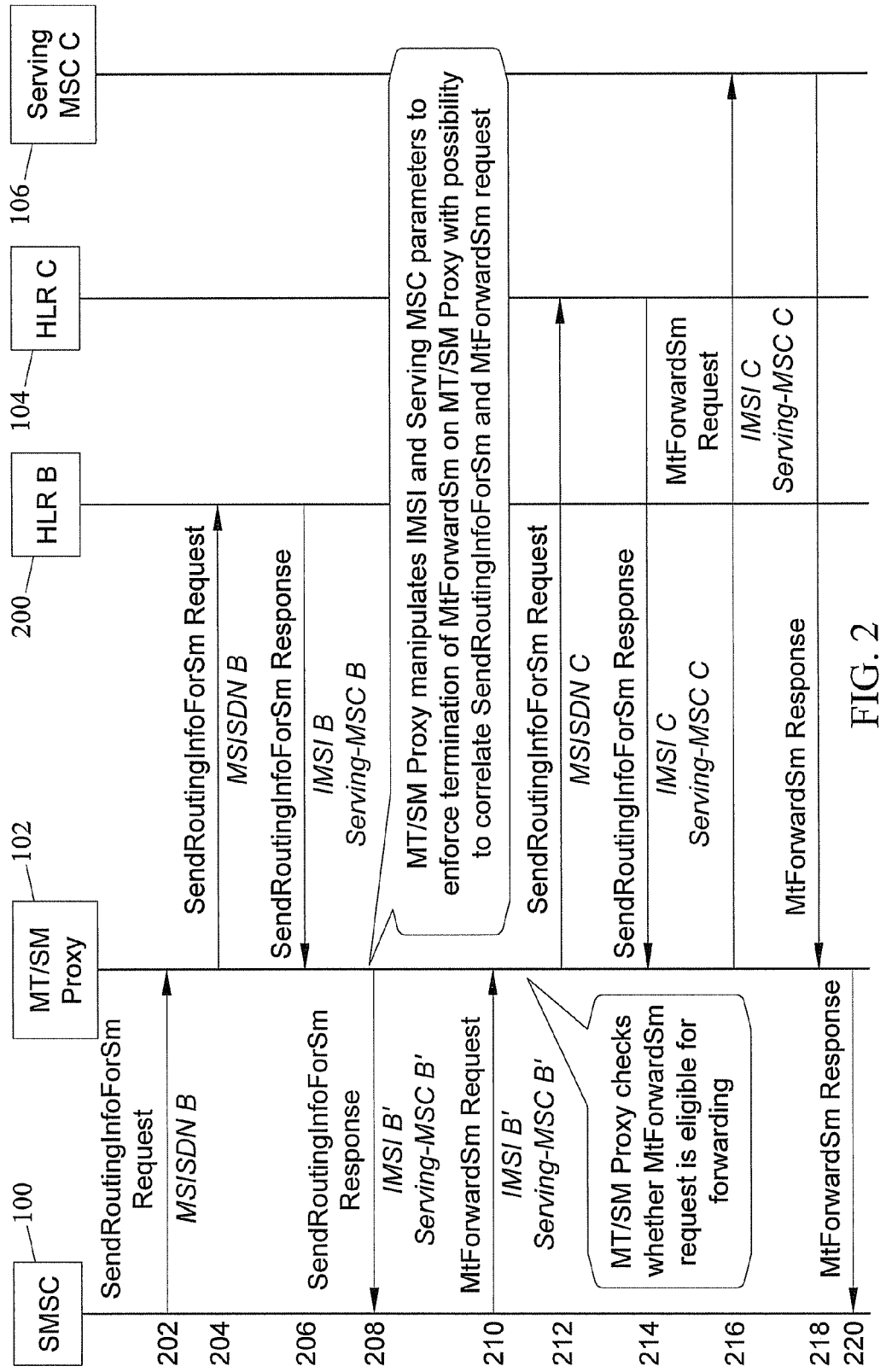
FIG. 2 is a message flow diagram illustrating an exemplary enhanced unconditional SMS forwarding scenario according to an embodiment of the subject matter described herein.

FIG. 2 is a message flow diagram illustrating an exemplary enhanced unconditional SMS forwarding scenario according to an embodiment of the subject matter described herein. In contrast to the basic unconditional forwarding method described above with respect to FIG. 1, the enhanced unconditional forwarding method may transparently relay the SendRoutingInfoForSm request to the HLR and modify the SendRoutingInfoForSm response in such a way that the MtForwardSm request is routed to the MT/SM Proxy. Upon receipt of the MtForwardSm request, MT/SM Proxy 102 may check whether the MT/SM is eligible for forwarding. If the MT/SM is eligible for forwarding, MT/SM Proxy 102 may issue a SendRoutingInfoForSm and a MtForwardSm for the forwarding destination.

In FIG. 2, subscriber B is the MT/SM's recipient and has set up unconditional forwarding to C. In addition to the network components shown in FIG. 1, FIG. 2 includes HLR B 200 that is the HLR for B. In step 202, SMSC 100 may begin by sending a SendRoutingInfoForSm Request message to MT/SM proxy 102. In step 204, MT/SM proxy 102 may forward the SendRoutingInfoForSm Request message, unmodified, to HLR B 200. HLR B 200 may return a SendRoutingInfoForSm Response message including IMSI B and an identifier for serving MSC B (not shown) to MT/SM proxy 102 in step 206. In step 208, MT/SM proxy 102 may manipulate the IMSI and serving MSC parameters to enforce termination of MtForwardSm on MT/SM proxy 102 with the possibility to correlate SendRoutingInfoForSm and MtForwardSm requests. Therefore, MT/SM proxy 102 may send SendRoutingInfoForSm Response message including IMSI B' and serving MSC B' parameters to SMSC 100 in step 208.

In response, SMSC 100 may send a MtForwardSm Request message including parameters for IMSI B' and serving MSC B' to MT/SM proxy 102 in step 210.

Also in step 210, MT/SM proxy 102 may determine whether the MtForwardSm Request is eligible for SMS forwarding service. In this case, MtForwardSm Request is eligible, and therefore, in step 212, MT/SM proxy 102 may send SendRoutingInfoForSm Request message including MSISDN C for HLR C 104. In step 214, HLR C 104 may return a SendRoutingInfoForSm Response message to MT/SM proxy 102. In step 216, MT/SM proxy 102 may then generate and send a MtForwardSm Request message including parameters for IMSI C and serving MSC C to serving MSC C 106. Serving MSC C 106 may return a MtForwardSm response message to MT/SM proxy 102 in step 218 and MT/SM proxy 102 may forward the MtForwardSm response message to SMSC 100 in step 220.

Figure 3:
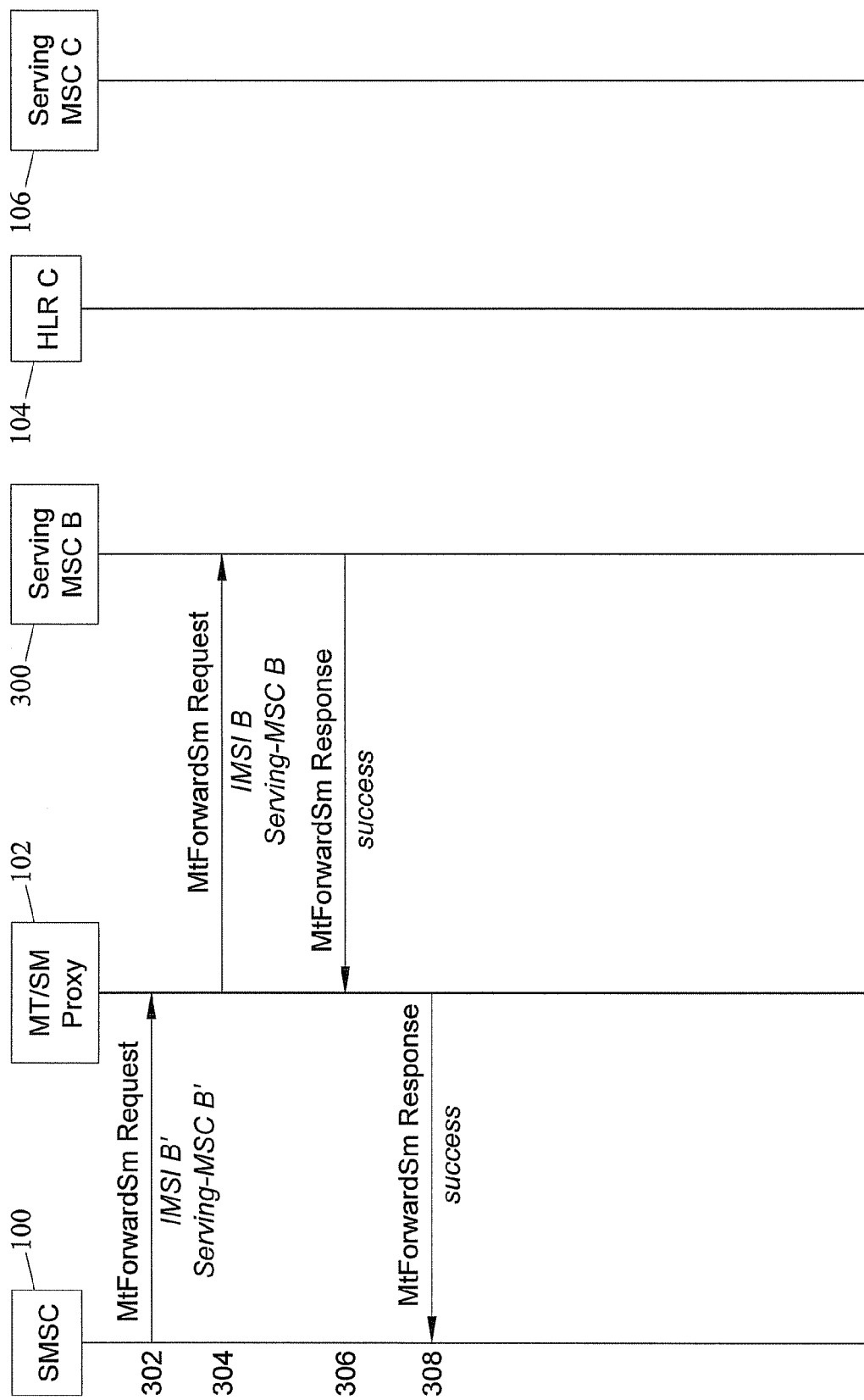
FIG. 3 is a message flow diagram illustrating an exemplary conditional SMS forwarding scenario according to an embodiment of the subject matter described herein.
Figure 4:
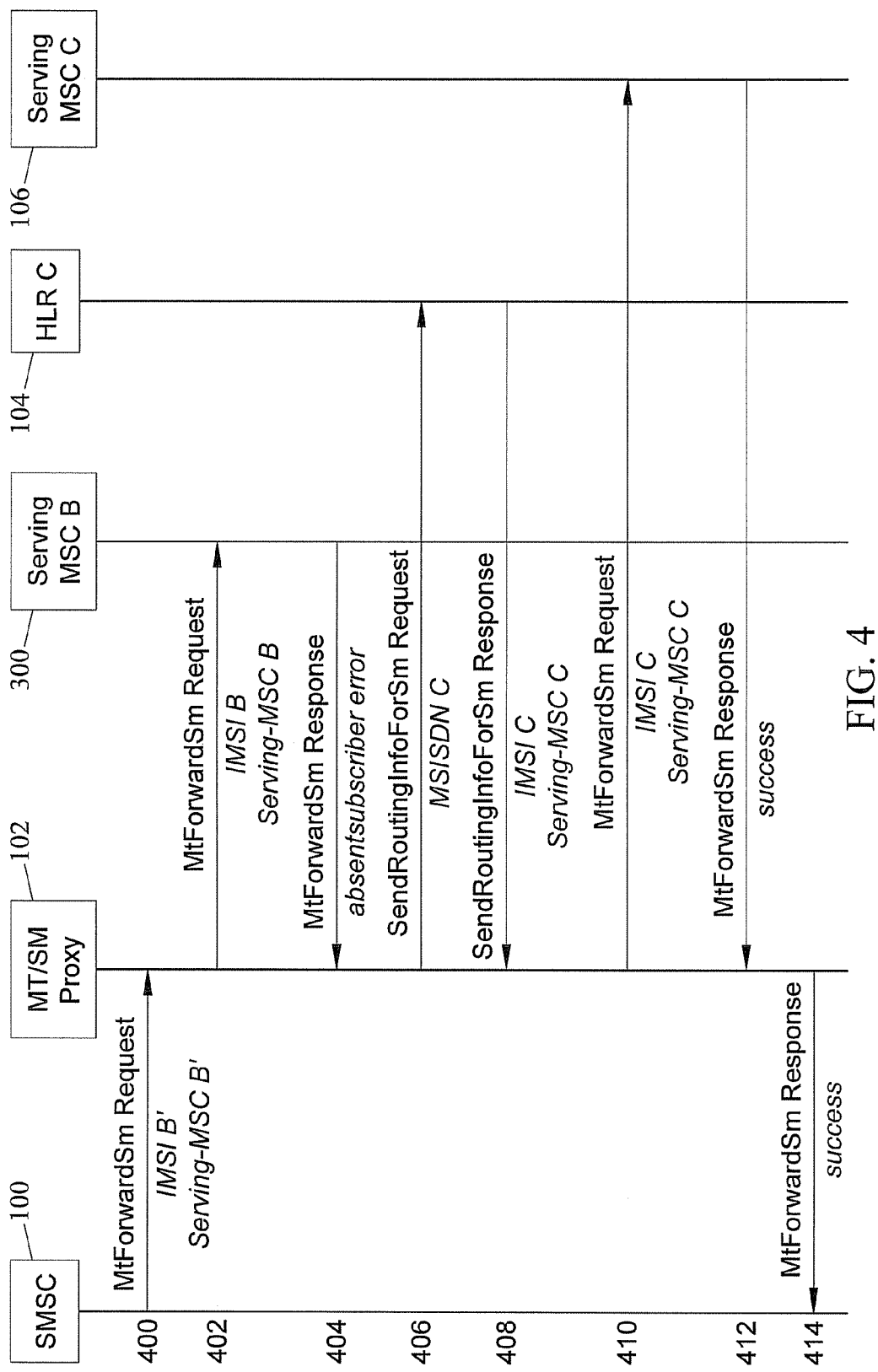
FIG. 4 is a message flow diagram illustrating an exemplary conditional SMS forwarding scenario according to an embodiment of the subject matter described herein.
Figure 5:
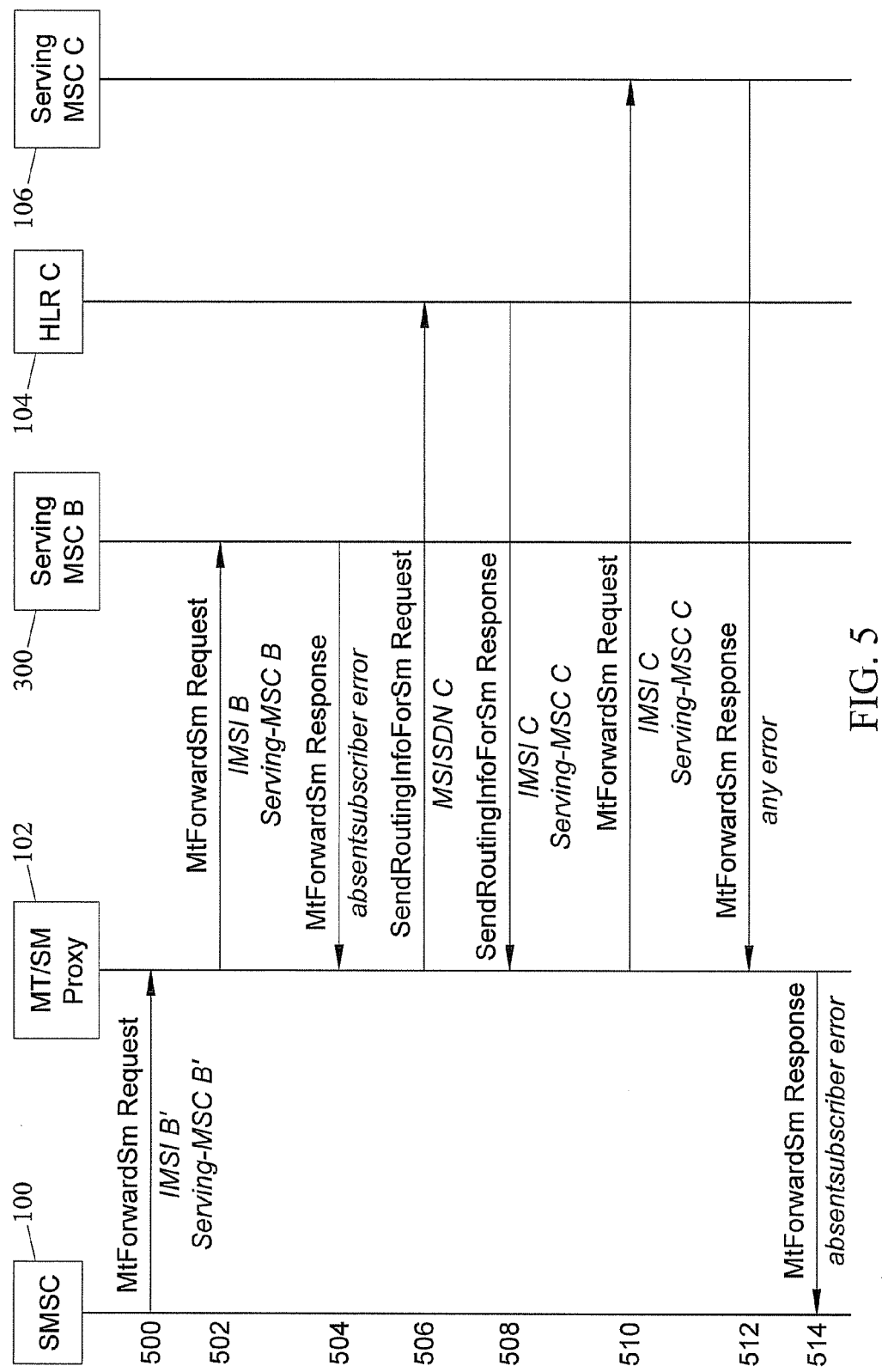
FIG. 5 is a message flow diagram illustrating an exemplary conditional SMS forwarding scenario according to an embodiment of the subject matter described herein.

FIG. 3-5 illustrate message flows for conditional SMS forwarding. Conditional forwarding works similar to the enhanced conditional forwarding, however, before querying the HLR for the forward destination, MT/SM Proxy 102 may attempt to deliver the MT/SM to the original recipient. If delivery fails (e.g., an Absent Subscriber error), then MT/SM proxy 102 may attempt to deliver the MT/SM to the designated forward destination. In FIGS. 3-5, subscriber B is the MT/SM's recipient and has setup conditional forwarding to C. It is appreciated that FIGS. 3-5 do not display the SendRoutingInfoForSm dialogue for B as this dialogue is the same as for the enhanced unconditional forwarding scenario described above with respect to FIG. 2. FIGS. 3-5 illustrate three different conditional forwarding scenarios. In FIG. 3, B is available. In FIG. 4, B is unavailable and C is available. In FIG. 5, B and C are both unavailable.

FIG. 3 is a message flow diagram illustrating an exemplary conditional SMS forwarding scenario according to an embodiment of the subject matter described herein. Referring to FIG. 3, in addition to the network components shown in FIGS. 1 and 2, serving MSC B 300 is shown. In step 302, SMSC 100 may send MtForwardSm Request message including message parameters for IMSI B' and serving MSC B' to MT/SM proxy 102. In step 304, MT/SM proxy 102 may modify the message parameters to refer to IMSI B and serving MSC B and send the modified MtForwardSm Request message to serving MSC B 300. In response, serving MSC B 300 may return a MtForwardSm Response message to MT/SM proxy 102 in step 306. Finally, in step 308, MT/SM proxy 102 may forward the MtForwardSm response message to SMSC 100.

FIG. 4 is a message flow diagram illustrating an exemplary conditional SMS forwarding scenario according to an embodiment of the subject matter described herein. Referring to FIG. 4, in step 400, SMSC 100 may send MtForwardSm Request message including message parameters for IMSI B' and serving MSC B' to MT/SM proxy 102. In step 402, MT/SM proxy 102 may modify the message parameters to refer to IMSI B and serving MSC B and send the modified MtForwardSm Request message to serving MSC B 300. In response, serving MSC B 300 may return a MtForwardSm Response message to MT/SM proxy 102 indicating that subscriber B is not available (e.g., absent subscriber error) in step 404. In step 406, MT/SM proxy 102 may send a SendRoutingInfoForSm Request message including MSISDN C to HLR C 104. HLR C 104 may respond by returning a SendRoutingInfoForSm Response message to MT/SM proxy 102 in step 408. In step 410, MT/SM proxy 102 may send a MtForwardSm Request message including IMSI C and serving MSC C to serving MSC C 106. If delivery to C was successful, serving MSC C 106 may return a MtForwardSm response message indicating success to MT/SM proxy 102 in step 412. In step 414, MT/SM proxy 102 may forward the MtForwardSm response message indicating success to SMSC 100.

FIG. 5 is a message flow diagram illustrating an exemplary conditional SMS forwarding scenario according to an embodiment of the subject matter described herein. Referring to FIG. 5, in step 500, SMSC 100 may send MtForwardSm Request message including message parameters for IMSI B' and serving MSC B' to MT/SM proxy 102. In step 502, MT/SM proxy 102 may modify the message parameters to refer to IMSI B and serving MSC B and send the modified MtForwardSm Request message to serving MSC B 300. In response, serving MSC B 300 may return a MtForwardSm Response message to MT/SM proxy 102 indicating that subscriber B is not available (e.g., absent subscriber error) in step 504. In step 506, MT/SM proxy 102 may send a SendRoutingInfoForSm Request message including MSISDN C to HLR C 104. HLR C 104 may respond by returning a SendRoutingInfoForSm Response message to MT/SM proxy 102 in step 508. In step 510, MT/SM proxy 102 may send a MtForwardSm Request message including IMSI C and serving MSC C to serving MSC C 106. In contrast to FIG. 4, C is not available and therefore delivery will not be successful. Thus, serving MSC C 106 may return a MtForwardSm response message indicating that subscriber C is also not available (e.g., absent subscriber error) to MT/SM proxy 102 in step 512. In step 514, MT/SM proxy 102 may forward the MtForwardSm response message including the error to SMSC 100.

Preventing Forwarding Loops

A simple approach for preventing forwarding loops may include denying SMS forwarding service to subscribers of other mobile networks. For example, if B has set up SMS forwarding to C, MT/SM Proxy 102 would only forward to C if B and C belong to the same mobile network.

A more enhanced method to prevent forwarding loops may be to add a marker to MtForwardSm requests for the forwarding destination. While 3rd Generation Partnership Project (3GPP) technical specification (TS) 23.040, which is incorporated by reference herein, does not define a specific forwarding marker, it does however allow a vendor to define its own information elements in the user data header. A specific range for information element identifier has been allocated for this purpose. MT/SM proxy 102 may add a vendor-specific information element for messages to forwarded messages. Thus, an enhanced method to prevent forwarding loops may be that whenever MT/SM Proxy 102 receives an MtForwardSm request, MT/SM Proxy 102 may check whether the vendor-specific information element for forwarding is present. If the information is present, MT/SM Proxy 102 may inspect the data of the information element to determine whether the MtForwardSm can be forwarded. It is appreciated that adding a vendor-specific information element may cause the User Data parameter of an MtForwardSM to be extended. International Patent No. WO 2005/101872 entitled, "Method for Preventing the Delivery of Short Message Service Message Spam" describes one method for extending the User Data parameter and enforcing the MtForwardSm to the MT/SM proxy and is incorporated by reference herein.

Figure 6:
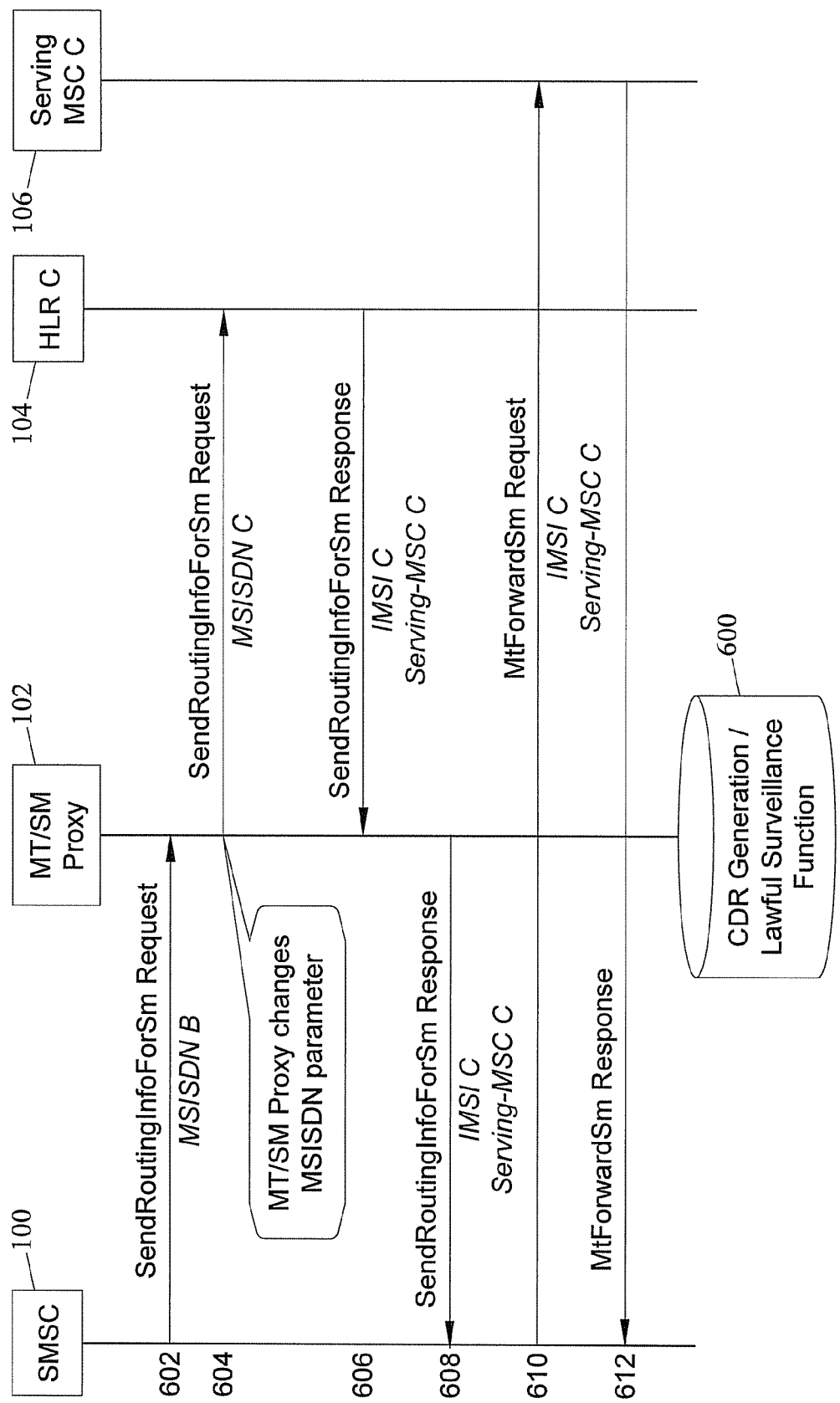
FIG. 6 is a message flow diagram illustrating an exemplary SMS forwarding scenario including lawful surveillance and intercept functionality according to an embodiment of the subject matter described herein.

FIG. 6 is a message flow diagram illustrating an exemplary SMS forwarding scenario including lawful surveillance and intercept functionality according to an embodiment of the subject matter described herein. Shown in FIG. 6 is an embodiment of the subject matter described herein that includes call detail record generation function/lawful surveillance (CDR/LS) function 600 which is associated with MT/SM proxy 102. According to one aspect, CDR/LS 600 function may be adapted to generate and store a record that documents the forwarding of a message service message from an original called subscriber/B-party to a forward-to called subscriber/B-party. The CDR/LS record may include a complete copy of the forwarded messaging service message (e.g., routing layer info+payload info), or may alternatively contain a portion of the information in the forwarded message service message. Exemplary message parameters stored in the record may include, but are not limited to, originating SMSC identifier, calling subscriber/A-party, called party/B-party, originating point code (OPC), destination point code (DPC), global title address (GTA), signaling connection control part (SCCP) layer information, TCAP layer information, MAP layer information. In session initiation protocol (SIP) messaging embodiments, the CDR/LS record may contain some, or all, of the messaging service message (e.g., header information, payload). The record may also include date and timestamp information.

The CDR/LS record may include sufficient information to associate the original messaging service message with the forwarded-to message because such provide information may be useful in tracing the delivery process associated with a messaging service message that has been forwarded.

CDR/LS 600 may store or cache CDR/LS records in a database co-located with MT/SM proxy 102. In an alternate embodiment, CDR/LS 600 may generate records and transmit these records to a remote application/storage facility (not shown) via a local area network (LAN), wide area network (WAN), or other network connection.

In another embodiment, CDR/LS function 600 may include, or have access to, a list of subscriber identifiers that have been placed under lawful surveillance (i.e., watched entities). CDR/LS function 600 may be adapted to check the forwarded-to subscriber identifier and determine if the forwarded to subscriber is a watched entity. If the forwarded-to subscriber is a watched entity, then CDR/LS 600 may generate a record of the forwarding event (as described above). The record may be stored or relayed to a surveillance authority. An exemplary lawful surveillance scenario is described below.

Referring to FIG. 6, in step 602, SMSC 100 may send a SendRoutingInfoForSm request message including MSISDN B to MT/SM proxy 102. MT/SM proxy 102 may modify the MSISDN parameter to include MSISDN C and, in step 604, may forward modified SendRoutingInfoForSm request message to HLR C 104. In step 606, HLR C 104 may return a SendRoutingInfoForSm response message including message parameters IMSI C and serving MSC C. In step 608, MT/SM proxy 102 may forward the SendRoutingInfoForSm message to SMSC 100. In response, in step 610, SMSC 100 may send a MtForwardSm request message including message parameters IMSI C and serving MSC C to serving MSC C 106. Finally, in step 612, serving MSC C 106 may return a MtForwardSm response message to SMSC 100.

Figure 7:
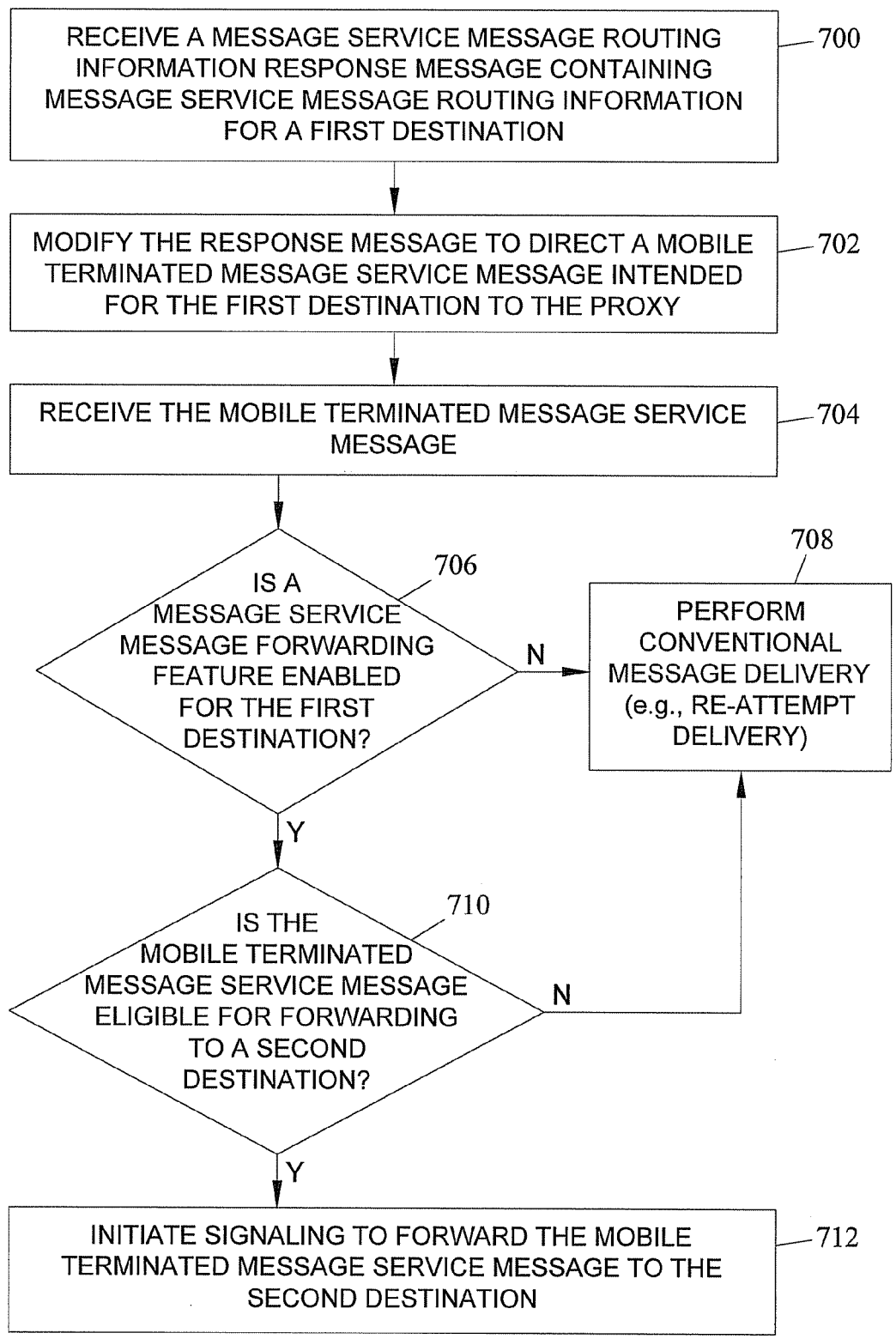
FIG. 7 is a flow chart showing exemplary steps for providing SMS forwarding according to an embodiment of the subject matter described herein.

FIG. 7 is a flow chart showing exemplary steps for providing SMS forwarding according to an embodiment of the subject matter described herein. Referring to FIG. 7, in step 700, a message service message routing information response message may be received, where the response message contains routing information for a first destination. For example, a SendRoutingInfoForSm response message for MSISDN B that includes IMSI B and serving MSC B may be received by an MT/SM proxy from the HLR of B.

In step 702, the response message may be modified to direct a MT/SM that was intended for the first destination to a MT/SM proxy instead. For example, the MSISDN included in the SendRoutingInfoForSm Request message may be modified from MSISDN B to MSISDN B'.

In step 704, the MT/SM may be received by the MT/SM proxy. For example, an MtForwardSm request message including IMSI B' and serving MSC B' may be received by the MT/SM proxy 102 from originating SMSC 100.

In step 706, it may be determined whether a message service forwarding feature is enabled for the first destination. For example, MT/SM proxy 102 may consult a list of subscriber identifiers associated with the SMS forwarding service in order to determine whether subscriber B has enabled SMS forwarding service.

If SMS forwarding service has not been enabled for the first destination, then control may proceed to step 708 where conventional message delivery may be performed. For example, conventional message delivery may include when an VMSC/SGSN indicates a short message delivery failure, the SMSC may send a message to the HLR using the MAP_REPORT_SM_DELIVERY_STATUS procedure. During the MAP_REPORT_SM_DELIVERY_STATUS procedure, the SMSC may indicate the reason for the delivery failure and request that the SMSC be put on a list of SMSCs wanting to be notified when the destination party becomes available again. The HLR may set a flag against the destination account, indicating that it is unavailable for short message delivery, and store the SMSC's address in a message waiting data (MWD) list for the destination party. Valid flags may include Mobile Not Reachable Flag (MNRF), Memory Capacity Exceeded Flag (MCEF) and Mobile Not Reachable for GPRS (MNRG). The HLR may then start responding to SRI-for-SM requests with a failure, indicating the failure reason, and automatically adding the requesting SMSC's address to the MWD list for the destination party.

The HLR may be informed of a subscriber becoming available for short message delivery in several ways. First, where the subscriber has been detached from the network, a reattach may trigger a Location Update to the HLR. Second, where the subscriber has been out of coverage, but not fully detached from the network, upon coming back into coverage the subscriber will respond to page requests from the Visitor Location Register (VLR) and the VLR may then send a Ready-for-SM (mobile present) message to the HLR. Third, where the MS formerly had its memory full, but now it does not (e.g., the subscriber deletes some texts), a Ready-for-SM (memory available) message may be sent from the VMSCNLR to the HLR. Upon receipt of an indication that the destination party is now ready to receive short messages, the HLR may send an AlertSC mobile application part (MAP) message to each of the SMSCs registered in the MWD list for the subscriber, causing the SMSC to start the short message delivery process again.

Additionally, the SMSC may go into a retry schedule, attempting to periodically deliver the SM at certain time intervals, without getting an alert. The retry schedule interval may depend on the original failure cause so that transient network failures may result in a short retry schedule, while out-of-coverage network failures may result in a longer retry schedule.

If SMS forwarding service is enabled for the first destination, it may be determined in step 710 whether the MT/SM is eligible for forwarding to a second destination. For example, the MT/SM may determine whether forwarded-to destination C is eligible for forwarding by consulting a list of subscriber identifiers associated with the SMS forwarding service. Like above, if SMS forwarding service is not enabled for the second destination, control may proceed to step 708 where conventional message delivery may be performed.

If SMS forwarding service is enabled for the second destination, in step 712, signaling may be initiated to forward the MT/SM to the second destination. For example, the MT/SM may send a SendRoutingInfoForSm request message for MSISDN C to the HLR for C. After receiving a SendRoutingInfoForSm response message from HLR C, the MT/SM may send a MtForwardSm request for IMSI C to serving MSC C. The MtForwardSm response message received from serving MSC C may be forwarded by the MT/SM to the originating SMSC.

Figure 8:
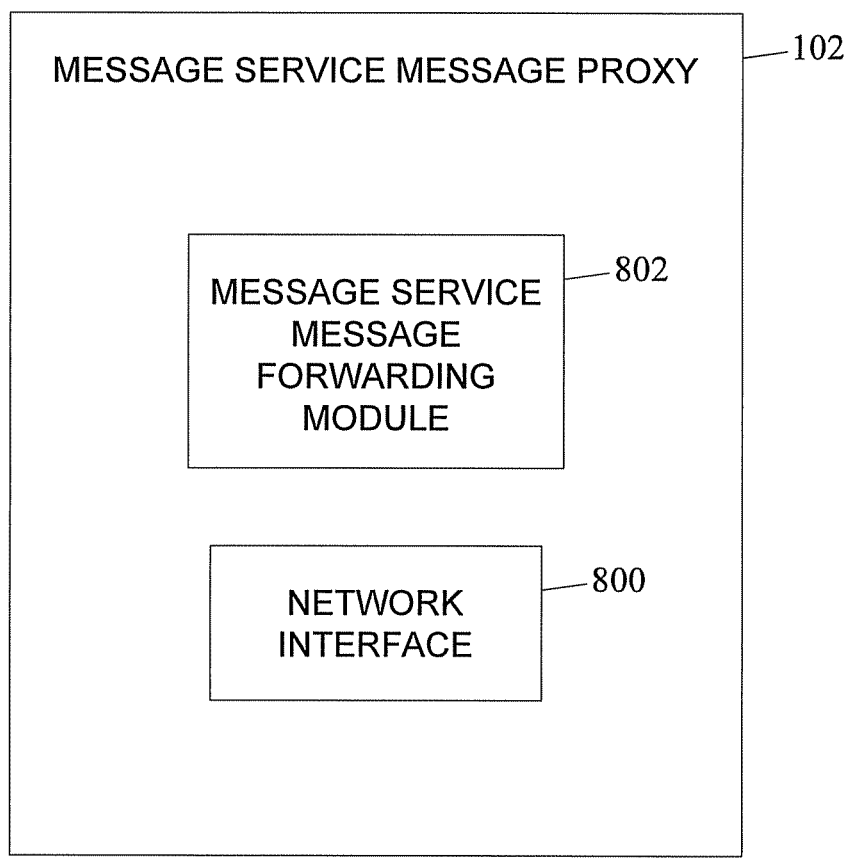
FIG. 8 is a block diagram of an exemplary system for providing SMS forwarding according to an embodiment of the subject matter described herein.

FIG. 8 is a block diagram of an exemplary system for providing SMS forwarding according to an embodiment of the subject matter described herein. Referring to FIG. 8, message service message proxy 102 may be separate from an SMSC and may be implemented on a computing platform including at least one processor (not shown). Message service message proxy 102 may include network interface 800 and message service message forwarding module 802. Network interface 800 may receive a message service message routing information response message containing message service message routing information for a first destination. Message service message forwarding module 802 may modify the response message to direct a mobile terminated message service message intended for the first destination to message service message proxy 102. Message service message forwarding module 802 may receive the mobile terminated message service message and determine whether a message service message forwarding feature is enabled for the first destination. In response to determining that a message service message forwarding feature is enabled for the first destination, message service message forwarding module 802 may determine whether the mobile terminated message service message is eligible for forwarding to a second destination and, in response to determining the mobile terminated message service message is eligible for forwarding, message service message forwarding module 802 may initiate signaling to forward the mobile terminated message service message to the second destination.

It will be understood that various details of the subject matter described herein may be changed without departing from the scope of the subject matter described herein. Furthermore, the foregoing description is for the purpose of illustration only, and not for the purpose of limitation, as the subject matter described herein is defined by the claims as set forth hereinafter.

What is claimed is:

1. A method for forwarding message service messages in a communications network, the method comprising:
at a message service message proxy separate from a short message service center (SMSC) and implemented on a computing platform including at least one processor:
receiving a message service message routing information response message containing message parameters including message service message routing information for a first destination;
modifying the received response message by manipulating the message parameters to include message service message routing information for the proxy, the modified response message being used to direct a mobile terminated message service message intended for the first destination to the proxy;
receiving the mobile terminated message service message;
determining whether a message service message forwarding feature is enabled for the first destination;
in response to determining that a message service message forwarding feature is enabled for the first destination, determining whether the mobile terminated message service message is eligible for forwarding to a second destination; and
in response to determining the mobile terminated message service message is eligible for forwarding, initiating signaling to forward the mobile terminated message service message to the second destination.

2. The method of claim 1 wherein determining whether the mobile terminated message service message is eligible for forwarding includes determining whether at least one parameter indicates the presence of looping.

3. The method of claim 1 wherein determining whether the mobile terminated message service message is eligible for forwarding includes determining whether the mobile terminated message service message is of a type that should not be forwarded.

4. The method of claim 1 comprising generating a message detail record (MDR) based on the forwarding of the mobile terminated message service message.

5. The method of claim 4 comprising:
accessing a list of subscriber identifier associated with subscribers that have been placed under lawful surveillance;
determining whether the destination subscriber identifier has been placed under lawful surveillance; and
in response to determining that the destination subscriber has been placed under lawful surveillance, relaying the MDR to a surveillance authority.

6. A system for forwarding message service messages in a communications network, the system comprising:
a message service message proxy separate from a short message service center (SMSC) and implemented on a computing platform including at least one processor, the message service message proxy including:
a network interface for:
receiving a message service message routing information response message containing message parameters including message service message routing information for a first destination; and
a message service message forwarding module for:
modifying the received response message by manipulating the message parameters to include message service message routing information for the proxy, the modified response message being used to direct a mobile terminated message service message intended for the first destination to the proxy;
receiving the mobile terminated message service message;
determining whether a message service message forwarding feature is enabled for the first destination;
in response to determining that a message service message forwarding feature is enabled for the first destination, determining whether the mobile terminated message service message is eligible for forwarding to a second destination; and
in response to determining the mobile terminated message service message is eligible for forwarding, initiating signaling to forward the mobile terminated message service message to the second destination.

7. The system of claim 6 wherein the message service message forwarding module is configured to determine whether the mobile terminated message service message is eligible for forwarding includes determining whether at least one parameter indicates the presence of looping.

8. The system of claim 6 wherein the message service message forwarding module is configured to determine whether the mobile terminated message service message is eligible for forwarding by determining whether the mobile terminated message service message is of a type that should not be forwarded.

9. The system of claim 6 comprising a call detail record generation/lawful surveillance module (CDR/LS) being associated with the message service message proxy for generating a message detail record (MDR) based on the forwarding of the mobile terminated message service message.

10. The system of claim 9 wherein the CDR/LS module transmits the records to a remote application or storage facility.

11. The system of claim 9 comprising a database being co-located with the MT/SM proxy, wherein the CDR/LS module stores or caches the records in the database.

12. The system of claim 9 wherein the CDR/LS module:
  accesses a list of subscriber identifier associated with subscribers that have been placed under lawful surveillance;
  determines whether the destination subscriber identifier has been placed under lawful surveillance; and
  in response to determining that the destination subscriber has been placed under lawful surveillance, relays the MDR to a surveillance authority.

13. A non-transitory computer readable medium comprising computer executable instructions embodied in a tangible computer readable medium and when executed by a processor of a computer performs steps comprising:
  at a message service message proxy separate from a short message service center (SMSC) and implemented on a computing platform including at least one processor:
    receiving a message service message routing information response message containing message parameters including message service message routing information for a first destination;
    modifying the received response message by manipulating the message parameters to include message service message routing information for the proxy, the modified response message being used to direct a mobile terminated message service message intended for the first destination to the proxy;
    receiving the mobile terminated message service message;
    determining whether a message service message forwarding feature is enabled for the first destination;
    in response to determining that a message service message forwarding feature is enabled for the first destination, determining whether the mobile terminated message service message is eligible for forwarding to a second destination; and
    in response to determining the mobile terminated message service message is eligible for forwarding, initiating signaling to forward the mobile terminated message service message to the second destination.

* * * * *